United States Patent
Takasaki

(10) Patent No.: US 11,325,183 B2
(45) Date of Patent: May 10, 2022

(54) SURFACE-MODIFIED METAL COMPOUND PARTICLES, AND METHOD FOR PRODUCING SURFACE-MODIFIED METAL COMPOUND PARTICLES

(71) Applicant: DAIICHI KIGENSO KAGAKU KOGYO CO., LTD., Osaka (JP)

(72) Inventor: Fumiyuki Takasaki, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 426 days.

(21) Appl. No.: 16/488,189

(22) PCT Filed: Feb. 16, 2018

(86) PCT No.: PCT/JP2018/005453
§ 371 (c)(1),
(2) Date: Aug. 22, 2019

(87) PCT Pub. No.: WO2018/173574
PCT Pub. Date: Sep. 27, 2018

(65) Prior Publication Data
US 2020/0030878 A1   Jan. 30, 2020

(30) Foreign Application Priority Data
Mar. 21, 2017   (JP) .............................. JP2017-054541

(51) Int. Cl.
*C09C 3/08* (2006.01)
*C09C 1/00* (2006.01)
*B22F 1/102* (2022.01)
*C01F 17/00* (2020.01)
*C01G 25/02* (2006.01)

(52) U.S. Cl.
CPC .............. *B22F 1/102* (2022.01); *C01F 17/00* (2013.01); *C01G 25/02* (2013.01)

(58) Field of Classification Search
None
See application file for complete search history.

(56) References Cited

FOREIGN PATENT DOCUMENTS

| JP | 2006-082994 A | 3/2006 |
| JP | 2007-254257 A | 10/2007 |
| JP | 2008-031023 A | 2/2008 |

OTHER PUBLICATIONS

International Search Report issued in PCT/JP2018/005453; dated Mar. 27, 2018.
Notification of Transmittal of Translation of the International Preliminary Report on Patentability (Chapter I) and Translation of Written Opinion of the International Searching Authority; PCT/JP2018/005453; dated Oct. 3, 2019.

*Primary Examiner* — Alexandre F Ferre
(74) *Attorney, Agent, or Firm* — Studebaker & Brackett PC

(57) ABSTRACT

Provided are surface-modified metal compound particles comprising metal compound particles which are surface-modified with one or more types of carboxylic acid selected from a methacrylic acid, an acrylic acid, and a propionic acid, and a 12-hydroxystearic acid, wherein a portion or all of the one or more types of carboxylic acid selected from a methacrylic acid, an acrylic acid, and a propionic acid is a carboxylic acid (protonated) type.

6 Claims, 1 Drawing Sheet

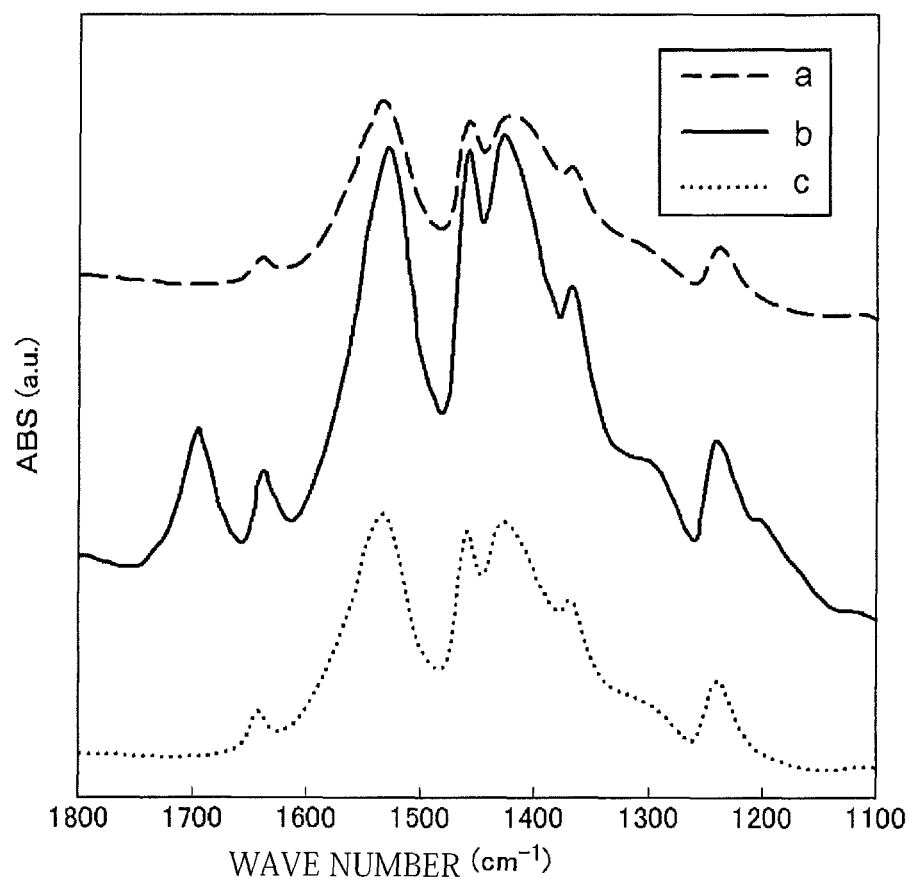

SURFACE-MODIFIED METAL COMPOUND PARTICLES, AND METHOD FOR PRODUCING SURFACE-MODIFIED METAL COMPOUND PARTICLES

TECHNICAL FIELD

The present invention relates to surface-modified metal compound particles, and a method for producing surface-modified metal compound particles.

BACKGROUND ART

Metal oxide particles and metal hydroxide particles have been widely used in the field such as refractories, ceramics, optical materials, and vehicle exhaust catalysts. In these applications, metal oxide particles and metal hydroxide particles are often used by mixing with other materials via a solvent. Therefore, for easier mixing, there is a need of metal oxide particles and metal hydroxide particles which are dispersed or being dispersable in various solvents depending on the applications. In particular, there is a high potential demand for particles being dispersable in an organic solvent such as ethanol. For this purpose, the particles are surface-modified with a surfactant such as a carboxylic acid for dispersing the particles in the organic solvent.

PRIOR ART DOCUMENT

Patent Documents

Patent Document 1: JP2008-31023A
Patent Document 2: JP2007-254257A
Patent Document 3: JP2006-82994A

SUMMARY OF THE INVENTION

Problems to be Solved by the Invention

In the prior arts, the method for controlling the adsorption condition of the surfactant for maximizing the dispersion performance in the organic solvent has not been described. As described above, surface-modified metal oxide particles and surface-modified hydroxide particles that are surface-modified with a carboxylic acid and that are focused on the dispersibility in conventionally used solvents in the prior arts such as ethanol have not been discovered.

The present invention has been made in view of these problems. An object of the present invention is to provide surface-modified metal compound particles having an optimized dispersibility in an organic solvent such as ethanol.

Means for Solving the Problems

As a result of earnest research efforts, the inventors have found that metal compound particles can be easily dispersed in an organic solvent such as ethanol by controlling an adsorption condition of a specified carboxylic acid when the metal compound particles are modified with the carboxylic acid, and then accomplished the present invention. That is, the present invention relates to surface-modified metal compound particles and a method for producing surface-modified metal compound particles, as described below.

In other words, the surface-modified metal compound particles of the present invention are characterized in that the surface-modified metal compound particles contain metal compound particles that are surface-modified with at least one carboxylic acid selected from methacrylic acid, acrylic acid, and propionic acid, and 12-hydroxystearic acid, and that a portion or all of the at least one carboxylic acid selected from methacrylic acid, acrylic acid, and propionic acid is a carboxylic acid (protonated) type.

In the present invention, suitably, the 12-hydroxystearic acid is a carboxylate (deprotonated) type.

In the present invention, suitably, a metal of a metal oxide and a metal hydroxide constituting the surface-modified metal compound particles is at least one metal selected from zirconium and rare earths.

In a method for producing the surface-modified metal compound particles described above, the method includes:
a step (1) of adding and mixing 12-hydroxystearic acid to metal compound particles having positive zeta potential and being dispersed in a water solvent;
a step (2) of adding and mixing at least one carboxylic acid selected from methacrylic acid, acrylic acid, and propionic acid to the metal compound particles having positive zeta potential and being dispersed in a water solvent;
a step (3) of washing a product obtained through the steps (1) and (2) with pure water; and
a step (4) of adding and mixing at least one carboxylic acid selected from methacrylic acid, acrylic acid, and propionic acid to the product obtained in the step (3).

In the method for producing surface-modified metal compound particles described above, suitably,
in the step (1), a molar ratio of the 12-hydroxystearic acid to zirconium is from 0.01 to 0.1,
in the step (2), a molar ratio of a total of the methacrylic acid, the acrylic acid, and the propionic acid to zirconium is from 0.01 to 0.5, and
in the step (4), a molar ratio of a total of the methacrylic acid, the acrylic acid, and the propionic acid to zirconium is from 0.01 to 0.5.

Effect of the Invention

The surface-modified metal compound particles of the present invention can easily provide metal compound particles which are dispersed in an organic solvent such as ethanol, so that the particles can be suitably used in this field.

BRIEF DESCRIPTION OF THE DRAWING

FIG. 1 shows infrared absorption spectra of precursor powder (a), surface-modified zirconia particles (b), and powder (c) obtained by washing the surface-modified zirconia particles with pure water, obtained in Example 1.

MODE FOR CARRYING OUT THE INVENTION

Next, one example of the surface-modified metal compound particles and method for producing surface-modified metal compound particles of the present invention will be described in detail. However, the present invention is not limited to these examples only.

<Surface-Modified Metal Compound Particles>

The final goal of the present invention is to obtain metal compound particles which are dispersed in an organic solvent.

The surface-modified metal compound particles according to this embodiment have a median diameter of, but not particularly limited, from about 1 to 100 nm when the particles are dispersed in an organic solvent. The median diameter means a particle size in which the cumulative volume frequency of particles becomes 50% when the particle size is measured by dynamic light scattering method. Examples of the organic solvent which can disperse the surface-modified metal compound particles include, without particular limitation, polar organic solvents such as ethanol, methyl isobutyl ketone, n-butylcellosolve, n-ethylcellosolve, methyl ethyl ketone, and methyl methacrylate. The particles can be dissolved in an amount of at least 60 wt % or more in these organic solvents in terms of metal oxide.

Suitable examples of the surface-modified metal compound particles include, without particular limitation, surface-modified metal oxide particles, and surface-modified metal hydroxide particles.

The metal oxide and metal hydroxide constituting the surface-modified metal compound particles and the surface-modified metal hydroxide particles include general materials composed of a metal atom, an oxygen atom and a hydroxyl group as a basic component, and mixtures, composites, and solid solutions thereof. Examples of the type of the metal oxide and the metal hydroxide include, without particular limitation, zirconia, hafnia, ceria, other rare-earth oxides, titania, alumina, silica, zirconium hydroxide, hafnium hydroxide, cerium hydroxide, other rare-earth hydroxides, titanium hydroxide, aluminum hydroxide, and mixtures, composites, and solid solutions thereof, which are often used as particles. They may be crystalline or amorphous, and may have any type of crystal systems. Zirconia and zirconium hydroxide generally mean those containing as inevitable impurities 1.3 to 2.5 wt % of hafnium oxide based on zirconium oxide. Zirconia may also contain rare earth elements, alkali metal elements, and alkaline-earth elements as a stabilizing agent for the crystalline phase. Elements other than metal elements may be added to the metal oxide and the metal hydroxide in order to modify the physical properties such as catalyst property, photocatalyst property, fluorescence property, and light absorption property. Impurities other than the above-described impurities may be contained as long as the final applied physical properties are not adversely affected.

The surface-modified metal compound particles according to this embodiment contains metal compound particles that are surface-modified with at least one carboxylic acid selected from methacrylic acid, acrylic acid, and propionic acid, and 12-hydroxystearic acid. The word "surface-modified" means that these carboxylic acids are adsorbed chemically or physically onto the surface of the metal compound particles. In this embodiment, a portion or all of the at least one carboxylic acid selected from methacrylic acid, acrylic acid, and propionic acid is required to be a carboxylic acid type.

In this specification, the carboxylic acid type is assumed to be in a protonated —COOH state among two chemical states —COOH and —COO⁻ by detaching a proton from the carboxyl group in a carboxylic acid. Objectively, it is defined that the carboxylic acid modifying metal compound particles is present in the carboxylic acid type when the peak attributed to C=O stretching is observed in the area of 1,680 to 1,720 cm$^{-1}$ in the measurement of the infrared absorption spectrum of the surface-modified metal compound particles.

By observing the peak attributed to C=O stretching in the area of 1,680 to 1,720 cm$^{-1}$ in the measurement of the infrared absorption spectrum of the surface-modified metal compound particles, it is found that a portion or all of the at least one carboxylic acid selected from methacrylic acid, acrylic acid, and propionic acid, and the 12-hydroxystearic acid is present in the carboxylic acid type. Further, when the infrared absorption spectrum of the surface-d metal compound particles is measured which is washed with a sufficient amount of pure water, the peak attributed to C=O stretching in the area of 1,680 to 1,720 cm$^{-1}$ is decreased or lost, and the at least one carboxylic acid selected from methacrylic acid, acrylic acid, and propionic acid is eluted in pure water used for washing. By this situation, it is defined that at least one water-soluble carboxylic acid selected from methacrylic acid, acrylic acid, and propionic acid in the surface-modified metal compound particles is present in a carboxylic acid state.

In FIG. 1, a to c show infrared absorption spectra of a precursor of surface-modified zirconia particles, surface-modified zirconia particles, powder obtained by washing the surface-modified zirconia particles with pure water, obtained in Example 1 as described below, respectively. In the surface-modified zirconia particles obtained in Example 1, the peak was observed at 1700 cm$^{-1}$. On the other hand, in the precursor and the powder obtained by washing the precursor, the same peak was not observed. In addition, both were hardly dispersed in ethanol. This shows that in the surface-modified metal compound particles, the adsorption of the at least one carboxylic acid selected from methacrylic acid, acrylic acid, and propionic acid in the carboxylic acid type is one of the most important requirements for ensuring the dispersibility.

When the surface-modified metal compound particles are dispersed in the organic solvent, it is unclear what mechanism contributes to the solvent dispersion by the carboxylic acid being adsorbed in the carboxylic acid type onto the particles. As a hypothesis, it is believed that the solvation of the particles is accelerated by substituting the solvent molecule with the carboxylic acid in the carboxylic acid type. Since the dispersing effect is not achieved when acetic acid, formic acid, or ethyl acetate is used as a substitute for the methacrylic acid, acrylic acid, and propionic acid, it is believed that the physical properties such as molecular weight, dipole moment, and polarizability of the methacrylic acid, acrylic acid, and propionic acid are suitable for the mechanism. On the other hand, although the 12-hydroxystearic acid may be present in the carboxylic acid type, the function similar to the function of the methacrylic acid, acrylic acid, and propionic acid is not exhibited, probably due to the incompatibility of the molecular weight.

In the surface-modified metal compound particles, the adsorption of the 12-hydroxystearic acid is one of the most important requirements for being dispersed in the organic solvent. As described above, even if the 12-hydroxystearic acid is present in the carboxylic acid type, it is believed that it is not effective for the dispersion in the organic solvent. Therefore, in the surface-modified metal compound particles, all 12-hydroxystearic acid is preferably present in the —COO⁻, carboxylate (deprotonated) type among two chemical states of the carboxyl group in the carboxylic acid as described above. In this case, it is believed that —COO⁻ is adsorbed onto or bonded to the surface of the metal compound particles, the aliphatic chain moiety of the 12-hydroxystearic acid, which is the main moiety for the affinity performance with the organic solvent, is oriented outward relative to the particles, and the moiety can contribute to the solvation effectively. On the other hand, a portion of the at least one carboxylic acid selected from methacrylic acid, acrylic acid, and propionic acid may be present in the carboxylate type. It is believed that the portion does not have the above-described function as in the 12-hydroxycarboxylic acid.

Although an adsorption amount of the 12-hydroxystearic acid in the surface-modified metal compound particles is not particularly limited, a molar ratio of the 12-hydroxystearic acid to zirconium [12-hydroxystearic acid]/[Zr] is from 0.01 to 0.1, and preferably from 0.02 to 0.05. Although an adsorption amount of the at least one carboxylic acid selected from methacrylic acid, acrylic acid, and propionic acid is not particularly limited, a molar ratio of a total of the at least one carboxylic acid selected from methacrylic acid, acrylic acid, and propionic acid to zirconium [methacrylic acid+acrylic acid+propionic acid]/[Zr] is from 0.01 to 0.6, and preferably from 0.1 to 0.5. If the amount is less than the lower limit, the dispersibility in the solvent may be impaired. If the amount is higher than the upper limit, it is not preferred since the applied properties of the surface-modified metal compound particles in the contemplated applications may be adversely affected. In many cases, since the carboxylic acid modifying the surface of the metal compound particles is for improving the affinity and the dispersibility in the solvent, the amount of the carboxylic acid is preferably as low as possible for the applied properties other than these properties.

In this embodiment, the surface modification is performed with use of the at least one carboxylic acid selected from methacrylic acid, acrylic acid, and propionic acid, and the 12-hydroxystearic acid in combination as well as the portion or all of the at least one carboxylic acid selected from methacrylic acid, acrylic acid, and propionic acid is controlled so as to be present in the carboxylic acid type, so that the solvent affinity performance of the carboxylic acid used for the surface modification is effectively exerted, and the total amount of the carboxylic acid used for the surface modification remains within a range of the minimum necessary.

Even if other materials than the at least one carboxylic acid selected from methacrylic acid, acrylic acid, and propionic acid, and the 12-hydroxystearic acid are adsorbed onto the surface of the surface-modified metal compound particles, the adsorption is not a particular problem as long as the particles have a median diameter of 1 to 100 nm during being dispersed in the organic solvent and the applied physical properties are not adversely affected.

<Method for Producing Surface-Modified Metal Compound Particles>

The method for producing surface-modified metal compound particles according to this embodiment will be described in detail.

The method for producing surface-modified metal compound particles according to this embodiment includes steps (1) to (4) below:

a step (1) of adding and mixing 12-hydroxystearic acid to metal compound particles having positive zeta potential and being dispersed in a water solvent;

a step (2) of adding and mixing at least one carboxylic acid selected from methacrylic acid, acrylic acid, and propionic acid to the metal compound particles having positive zeta potential and being dispersed in a water solvent;

a step (3) of washing a product obtained through the steps (1) and (2) with pure water; and a step (4) of adding and mixing at least one carboxylic acid selected from methacrylic acid, acrylic acid, and propionic acid to the product obtained in the step (3).

In the steps (1) to (4) described below, the reaction rate can be suitably changed depending on production conditions by adjusting the temperature in the steps based on the principle of general chemical reaction rate.

The steps (1) and (2) will be described. Metal compound particles as a raw material (for example, metal oxide particles and metal hydroxide particles) are not limited as long as the final physical properties of the final product are satisfied. Generally, a sol is used which is obtained by dispersing metal oxide particles, metal hydroxide particles, or the mixture of metal oxide particles and metal hydroxide particles in water with a median diameter of 1 to 100 nm. Examples of the metal of the metal oxide and the metal hydroxide include, but are not limited to, zirconium, cerium, other rare earths, titanium, aluminum, and silicon. For example, the zirconia sol and the ceria sol disclosed in Patent Document 1, Patent Document 2, and Patent Document 3 can be used as a starting material. Hereinafter, metal oxide particles and metal hydroxide particles which are used as a starting material including sol also refer to as "particles to be modified".

Preferably, the particles to be modified which are dispersed in water have positive zeta potential. This is because, in the subsequent surface-modification treatment, the orientation state which is suitable for solvation and in which an aliphatic chain having high affinity for the solvent is oriented outward relative to the particles is formed by attracting and then adsorbing or bonding —COO⁻ group of the 12-hydroxystearic acid having negative charge to the surface of the particles to be modified due to the positive zeta potential. This 12-hydroxystearic acid is the carboxylate type. It is assumed that the at least one carboxylic acid selected from methacrylic acid, acrylic acid, and propionic acid is also adsorbed or bonded in the carboxylate type by the mechanism similar to that of the 12-hydroxystearic acid. However, it is believed that the carboxylic acid does not much contribute to the solvation with the organic solvent as in the 12-hydroxystearic acid, and it simply functions to hydrophobize the surface of the particles to be modified. If the surface of the particles to be modified is not hydrophobized by the 12-hydroxystearic acid only, water solvent and the particles to be modified are not separated, and the next step (3) is difficult to be smoothly performed. Accordingly, in this case, the at least one carboxylic acid selected from methacrylic acid, acrylic acid, and propionic acid is added.

Although amounts of the at least one carboxylic acid selected from methacrylic acid, acrylic acid, and propionic acid, and the 12-hydroxystearic acid used for the surface modification are not particularly limited, the molar ratio [12-hydroxystearic acid]/[Zr] is from 0.01 to 0.1, and more preferably from 0.02 to 0.05, and the molar ratio [methacrylic acid+acrylic acid+propionic acid]/[Zr] is from 0.01 to 0.5, and preferably from 0.1 to 0.4.

Although the method for adding the carboxylic acid to the particles to be modified is not particularly limited, a solution of 12-hydroxystearic acid in alcohol is generally added to a sol of the particles to be modified dispersed in water under stirring. For the type of alcohol as the solvent, methanol, ethanol, n-propanol, isopropanol, and n-butanol can be used. Any solvent other than alcohols may be used as long as it dissolves 12-hydroxystearic acid. In this case, although the concentration of the 12-hydroxystearic acid is not particularly limited, the concentration is from 1 to 20 wt %, and preferably from 5 to 16 wt %. Next, the at least one carboxylic acid selected from methacrylic acid, acrylic acid, and propionic acid in undiluted solution or in diluted solution with any alcohol similar to one described above is added to the particles to be modified. After the addition, the carboxylic acid and the particles to be modified are mixed by stirring. Although the stirring time is not particularly limited, the time is generally from 30 minutes to 2 hours. A product which is generally in paste form is obtained through the steps (1) and (2).

Next, the step (3) will be described. Impurities attached to the product obtained through the steps (1) and (2), the impurities being ion ingredients derived from the particles to be modified as the starting material and alcohol solvents used in the steps (1) and (2), are removed by charging the product to pure water, or by adding pure water to the product. If the impurities are not particularly problematic in the downstream applied product, the step (3) is not essential. However, these impurities are preferably removed as much as possible. A product which is generally in powder form is obtained through the step (3).

Next, the step (4) will be described. The at least one carboxylic acid selected from methacrylic acid, acrylic acid, and propionic acid is added to the product obtained in the step (4), followed by mixing. The at least one carboxylic acid selected from methacrylic acid, acrylic acid, and propionic acid adsorbed in the carboxylic acid type is required to the surface-modified metal compound particles of this embodiment, and the step (4) is a step for adsorbing the carboxylic acid in the carboxylic acid type.

Depending on the conditions of the step (1), it is assumed that the at least one carboxylic acid selected from methacrylic acid, acrylic acid, and propionic acid is adsorbed in the carboxylic acid type onto the particles to be modified at the end of the step. If so, the carboxylic acid in the carboxylic acid type is generally removed with impurities by washing with pure water in the step (3).

Although the amount of the at least one carboxylic acid selected from methacrylic acid, acrylic acid, and propionic acid used in this step is not particularly limited, the molar ratio [methacrylic acid+acrylic acid+propionic acid]/[Zr] is from 0.01 to 0.5, and preferably from 0.1 to 0.4. Although the method for adding the carboxylic acid to the particles to be modified is not particularly limited, the carboxylic acid is generally added to the product in the step (3) directly without being diluted with a solvent. After the addition, the carboxylic acid and the particles to be modified are mixed by kneading. A product which is generally in powder form, i.e., the surface-modified metal compound particles of this embodiment are obtained through the step (4).

EXAMPLES

Hereinafter, the present invention will be made clearer by way of Examples. It is noted that the present invention is not limited to aspects of Examples. The surface-modified zirconia particles obtained in Examples and Comparative Examples contain 1.3 to 2.5 wt % of hafnium oxide based on zirconium oxide as inevitable impurities. The analysis conditions of Examples will be described below. The reagents used in Examples will be described below.

Hereinafter, wt % will be simply described as %
<Infrared Absorption Spectrum>
Model: FT/IR620 (JASCO Corporation)
Method: ATR method (using ATR-ONE unit)
<Particle Size Measurement>
Model: Zetasizer Nano ZS (Malvern)
Measurement concentration: 30% in terms of metal oxide
Measurement temperature: 25° C.
Scattering angle: 173°
<Reagents>
12-hydroxystearic acid (Tokyo Chemical Industry Co., Ltd.)
n-butanol (Sigma-Aldrich Japan, first grade)
methacrylic acid (Tokyo Chemical Industry Co., Ltd.)
acrylic acid (Sigma-Aldrich Japan, first grade)
propionic acid (Sigma-Aldrich Japan, first grade)
88% formic acid (Kishida Chemical Co., Ltd., special grade)
glacial acetic acid (Sigma-Aldrich Japan, first grade)
ethanol (Sigma-Aldrich Japan, first grade)
anhydrous citric acid (Kishida Chemical Co., Ltd., special grade)
25% ammonia water (Sigma-Aldrich Japan, special grade)

Example 1

First, a zirconia sol as particles to be modified was obtained by the following procedures. Pure water was added to 886.7 g of aqueous zirconium oxychloride solution (containing 180.0 g as $ZrO_2$) to be 1,000 g. On the other hand, pure water was added to 747.9 g of aqueous sodium hydroxide solution (containing 187.0 g as 100% NaOH) to be 1,400 g, and heated to 90° C. Next, the aqueous zirconium oxychloride solution was added to the aqueous sodium hydroxide solution heated at 90° C., and then the mixture was cooled to room temperature. In this time, the solution had a pH of 13.7. The solution was filtered, washed with 5,000 g of pure water to remove impurities in zirconium hydroxide, and then 651.7 g of wet cake was obtained. To a beaker was charged 538.8 g of the wet cake, and pure water was added thereto to be 1,000 g. The mixture was stirred for 10 minutes to disperse the zirconium hydroxide homogeneously. Then, 60.35 g of 61% nitric acid was added as a deflocculant, the mixture was heated to 100° C., and stirred and kept for 72 hours to obtain a zirconia sol. It was found that the resulting solution was transparent and light blue in color and changed to the zirconia sol completely. Then, the solution was cooled to room temperature, ultra-filtered through a membrane filter, and washed with 500 g of pure water twice, and pure water was added thereto to obtain 500.0 g of the zirconia sol. The resulting zirconia sol had a pH of 3.3, a $ZrO_2$ concentration of 30%, and positive zeta potential.

One hundred and fifty grams of the sol was stirred. To the sol was added 25 g of a solution of 12-hydroxystearic acid in n-butanol (the concentration: 12%) (molar ratio [12-hydroxystearic acid]/[Zr]=0.027), and the mixture was stirred for 30 minutes. Next, while stirring, 6 g of methacrylic acid (molar ratio [methacrylic acid]/[Zr]=0.19) was added, and the mixture was stirred for 30 minutes. When the stirring was stopped and the mixture was left to stand, a transparent supernatant and a paste-like precipitate were obtained. The precipitate was added dropwise to 1 L of pure water (ion-exchanged water) under stirring to obtain a powdery precipitate. The powdery precipitate was filtered with a Nutsche funnel, washed by passing 1 L of pure water, and dewatered to obtain a precursor powder. a in FIG. 1 shows the infrared absorption spectrum of the powder. The spectrum had no peak at 1700 $cm^{-1}$. Methacrylic acid in an amount corresponding to the molar ratio [methacrylic acid]/[Zr]=0.11 was added to the powder, mixed thoroughly, and dried in an oven at 50° C. for 2 hours to obtain surface-modified zirconia particles. b in FIG. 1 shows the infrared absorption spectrum of the particles. In the infrared absorption spectrum, the peak derived from C=O was observed at 1700 $cm^{-1}$. The particles were added to ethanol and stirred to obtain a sol containing 60% $ZrO_2$. When the particle size of the sol was measured by dynamic light scattering method, the sol had a median diameter of 6 nm.

Example 2

Surface-modified zirconia particles were obtained in the same manner as in Example 1 except that acrylic acid was added to the precursor powder in an amount corresponding to the molar ratio [acrylic acid]/[Zr]=0.13. In the infrared absorption spectrum of the particles, the peak derived from C=O was observed at 1700 cm$^{-1}$. The particles were added to ethanol and stirred to obtain a sol containing 60% $ZrO_2$. When the particle size of the sol was measured by dynamic light scattering method, the sol had a median diameter of 13 nm.

Example 3

Surface-modified zirconia particles were obtained in the same manner as in Example 1 except that propionic acid was added to the precursor powder in an amount corresponding to the molar ratio [propionic acid]/[Zr]=0.12. In the infrared absorption spectrum of the particles, the peak derived from C=O was observed at 1700 cm$^{-1}$. The particles were added to ethanol and stirred to obtain a sol containing 60% $ZrO_2$. When the particle size of the sol was measured by dynamic light scattering method, the sol had a median diameter of 10 nm.

Example 4

First, a ceria sol as particles to be modified was obtained by the following procedures. Two thousands grams of an aqueous solution containing ceric nitrate (containing 120 g of Ce as $CeO_2$, $CeO_2$ concentration of 6 wt %; pH of 1 or less) was stirred under reflux and kept at 100° C. for 24 hours. Then, the aqueous solution was left to stand at an atmosphere temperature of 20 to 25° C. overnight, the supernatant was removed by decantation to leave a precipitate (ceria sol precursor, the same shall apply hereinafter), and then ceric nitrate and pure water were added thereto to be 2,000 g (without considering the presence of the precipitate, containing 120 g of Ce as $CeO_2$, $CeO_2$ concentration of 6 wt %; pH of 1 or less). The aqueous solution containing ceric nitrate with the precipitate was kept at 1,000° C. for 24 hours while stirring under reflux again. Then, the aqueous solution was left to stand at an atmosphere temperature of 20 to 25° C. overnight, the supernatant was removed by decantation to leave a precipitate, and then ceric nitrate and pure water were added thereto to be 2,000 g (without considering the presence of the precipitate, containing 120 g of Ce as $CeO_2$, $CeO_2$ concentration of 6 wt %; pH of 1 or less). The aqueous solution containing ceric nitrate with the precipitate was kept at 100° C. for 24 hours while stirring under reflux again. Then, the aqueous solution was left to stand at an atmosphere temperature of 20 to 25° C. overnight, the supernatant was removed by decantation and filtered. A ceria sol was obtained by adding 533 mL of pure water to 188 g (wet) of the resulting precipitate.

The ceria sol obtained according to the above-mentioned method was purified and concentrated by ultrafiltration to obtain a ceria sol (pH 3.1, $CeO_2$ concentration: 30%, zeta potential: positive). Surface-modified ceria particles were obtained in the same manner as in Example 1 except that 150 g of the sol was used as the starting material. In the infrared absorption spectrum of the particles, the peak derived from C=O was observed at 1700 cm$^{-1}$. The particles were added to ethanol and stirred to obtain a sol containing 50% $CeO_2$. When the particle size of the sol was measured by dynamic light scattering method, the sol had a median diameter of 35 nm.

Comparative Example 1

The precursor powder obtained in Example 1 was dried in an oven at 50° C. for 2 hours to obtain surface-modified zirconia particles. The infrared absorption spectrum of the particles had no peak at 1700 cm$^{-1}$ (a in FIG. 1). Although the particles were added to ethanol and stirred, major amount of precipitates were remained and the particles were not dispersed.

Comparative Example 2

Surface-modified zirconia particles were obtained in the same manner as in Example 1 except that glacial acetic acid was added to the precursor powder in an amount corresponding to the molar ratio [acetic acid]/[Zr]=0.15. The infrared absorption spectrum of the particles had no peak at 1700 cm$^{-1}$. Although the particles were added to ethanol and stirred, major amount of precipitates were remained and the particles were not dispersed.

Comparative Example 3

Surface-modified zirconia particles were obtained in the same manner as in Example 1 except that 88% formic acid was added to the precursor powder in an amount corresponding to the molar ratio [formic acid]/[Zr]=0.18. The infrared absorption spectrum of the particles had no peak at 1700 cm$^{-1}$. Although the particles were added to ethanol and stirred, major amount of precipitates were remained and the particles were not dispersed.

Comparative Example 4

Surface-modified zirconia particles were obtained in the same manner as in Example 1 except that 150 g of the zirconia sol was stirred, and 25 g of a solution of methacrylic acid in n-butanol (ingredient concentration: 3.4%) (molar ratio [methacrylic acid]/[Zr]=0.027) was added, and stirred for 30 minutes. In the infrared absorption spectrum of the particles, the peak derived from C=O was observed at 1700 cm$^{-1}$. Although the particles were added to ethanol and stirred, major amount of precipitates were remained and the particles were not dispersed.

Comparative Example 5

Anhydrous citric acid was added in an amount corresponding to the molar ratio [citric acid]/[Zr]=0.3 to the zirconia sol obtained according to the method of Example 1 in Patent Document 1 ($ZrO_2$:30%, pH 3.3, zeta potential: positive), and then ammonia water was added to adjust the pH to 9.0. Then, the mixture was purified and concentrated by ultrafiltration to obtain a zirconia sol ($ZrO_2$:30%, pH 7.8, zeta potential: negative). Although Comparative Example 5 was performed in the same manner as in Example 1 except that 150 g of the sol was used as the starting material, the reaction between the carboxylic acid and the sol did not proceed sufficiently, and the precursor powder was hardly obtained.

The invention claimed is:
1. Surface-modified metal compound particles comprising metal compound particles that are surface-modified with at least one carboxylic acid selected from methacrylic acid, acrylic acid, and propionic acid, and 12-hydroxystearic acid, wherein
a portion or all of the at least one carboxylic acid selected from methacrylic acid, acrylic acid, and propionic acid is a carboxylic acid (protonated) type.

2. The surface-modified metal compound particles according to claim 1, wherein the 12-hydroxystearic acid is a carboxylate (deprotonated) type.

3. The surface-modified metal compound particles according to claim 2, wherein a metal of a metal oxide and a metal hydroxide constituting the surface-modified metal compound particles is at least one metal selected from zirconium and rare earths.

4. The surface-modified metal compound particles according to claim 1, wherein a metal of a metal oxide and a metal hydroxide constituting the surface-modified metal compound particles is at least one metal selected from zirconium and rare earths.

5. A method for producing the surface-modified metal compound particles according to claim 1, the method comprising:
- a step (1) of adding and mixing 12-hydroxystearic acid to metal compound particles having positive zeta potential and being dispersed in a water solvent;
- a step (2) of adding and mixing at least one carboxylic acid selected from methacrylic acid, acrylic acid, and propionic acid to the metal compound particles having positive zeta potential and being dispersed in a water solvent;
- a step (3) of washing a product obtained through the steps (1) and (2) with pure water; and
- a step (4) of adding and mixing at least one carboxylic acid selected from methacrylic acid, acrylic acid, and propionic acid to the product obtained in the step (3).

6. The method for producing the surface-modified metal compound particles according to claim 5, wherein
- in the step (1), a molar ratio of the 12-hydroxystearic acid to zirconium is from 0.01 to 0.1,
- in the step (2), a molar ratio of a total of the methacrylic acid, the acrylic acid, and the propionic acid to zirconium is from 0.01 to 0.5, and
- in the step (4), a molar ratio of a total of the methacrylic acid, the acrylic acid, and the propionic acid to zirconium is from 0.01 to 0.5.

* * * * *